(12) United States Patent
Xu et al.

(10) Patent No.: US 11,125,575 B2
(45) Date of Patent: Sep. 21, 2021

(54) METHOD AND APPARATUS FOR ESTIMATING A LOCATION OF A VEHICLE

(71) Applicant: HERE GLOBAL B.V., Eindhoven (NL)

(72) Inventors: Jingwei Xu, Buffalo Grove, IL (US); Bruce Bernhardt, Wauconda, IL (US); Yuxin Guan, Eindhoven (NL); Arnold Sheynman, Northbrook, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/689,777

(22) Filed: Nov. 20, 2019

(65) Prior Publication Data

US 2021/0148719 A1   May 20, 2021

(51) Int. Cl.
*G01C 21/36* (2006.01)
*G06K 9/00* (2006.01)
(Continued)

(52) U.S. Cl.
CPC ..... *G01C 21/3602* (2013.01); *G01C 21/3667* (2013.01); *G01S 17/89* (2013.01);
(Continued)

(58) Field of Classification Search
None
See application file for complete search history.

(56) References Cited

U.S. PATENT DOCUMENTS 7,610,146 B2   10/2009   Breed
8,417,444 B2   4/2013   Smid et al.
(Continued)

FOREIGN PATENT DOCUMENTS

EP   3 279 611 A1   2/2018
EP   3 722 173 A1   10/2020
(Continued)

OTHER PUBLICATIONS

Tao, Z. et al., *Mapping and Localization Using GPS, Lane Markings and Proprioceptive Sensors*, Proceedings of the IEEE/RSJ International Conference on Intelligent Robots and Systems (Nov. 2013) 7 pages.
(Continued)

*Primary Examiner* — Stefan Gadomski
(74) *Attorney, Agent, or Firm* — Alston & Bird LLP

(57) ABSTRACT

A method, apparatus and computer program product are provided to estimate the location of a vehicle based at least in part upon two or more road signs that are depicted by one or more images captured by one or more image capture devices onboard the vehicle. By relying at least in part upon the two or more road signs, the location of the vehicle may be refined or otherwise estimated with enhanced accuracy, such as in instances in which there is an inability to maintain a line-of-sight with the satellites of a satellite positioning system or otherwise in instances in which the location estimated based upon reliance on satellite or radio signals is considered insufficient. As a result, the vehicle may be navigated in a more informed and reliable manner and the relationship of the vehicle to other vehicles may be determined with greater confidence.

18 Claims, 7 Drawing Sheets

(51) Int. Cl.
  *G06T 7/33* (2017.01)
  *G01S 17/89* (2020.01)
  *G08G 1/0967* (2006.01)
(52) U.S. Cl.
  CPC ..... *G06K 9/00798* (2013.01); *G06K 9/00818* (2013.01); *G06T 7/337* (2017.01); *G08G 1/096716* (2013.01); *G06T 2207/30256* (2013.01)

(56) References Cited

U.S. PATENT DOCUMENTS

| | | | |
|---|---|---|---|
| 10,719,957 B2* | 7/2020 | Zhou | G06T 7/70 |
| 2002/0106109 A1* | 8/2002 | Retterath | G01S 17/06 382/104 |
| 2003/0128135 A1* | 7/2003 | Poltorak | G08G 1/0965 340/906 |
| 2003/0128139 A1* | 7/2003 | Poltorak | G08G 1/0969 340/995.19 |
| 2004/0010352 A1* | 1/2004 | Stromme | G08G 1/096758 701/1 |
| 2004/0267452 A1* | 12/2004 | Igarashi | G01S 7/4021 701/300 |
| 2005/0125121 A1* | 6/2005 | Isaji | G08G 1/165 701/36 |
| 2005/0128063 A1* | 6/2005 | Isaji | B60W 10/18 340/439 |
| 2008/0319648 A1* | 12/2008 | Poltorak | G08G 1/0969 701/423 |
| 2010/0302361 A1* | 12/2010 | Yoneyama | G06K 9/00818 348/135 |
| 2011/0081081 A1* | 4/2011 | Smith | G06K 9/00818 382/170 |
| 2011/0210867 A1* | 9/2011 | Benedikt | G08G 1/096725 340/905 |
| 2012/0166033 A1* | 6/2012 | Byun | G05D 1/0246 701/23 |
| 2015/0104757 A1* | 4/2015 | Moncrief | G09B 9/05 434/38 |
| 2015/0345974 A1* | 12/2015 | Takahashi | B60W 50/14 701/461 |
| 2016/0049076 A1* | 2/2016 | Waite | A61B 3/113 340/905 |
| 2016/0117923 A1* | 4/2016 | Dannenbring | G08G 1/09623 340/905 |
| 2016/0231746 A1* | 8/2016 | Hazelton | G01S 13/867 |
| 2016/0349072 A1* | 12/2016 | Yoshitomi | G01C 21/3602 |
| 2017/0008521 A1* | 1/2017 | Braunstein | G01C 21/3407 |
| 2017/0016740 A1 | 1/2017 | Cui et al. | |
| 2017/0074964 A1 | 3/2017 | Xu et al. | |
| 2017/0242443 A1* | 8/2017 | Schuh | G06K 9/00791 |
| 2017/0291611 A1* | 10/2017 | Innes | G07C 5/0841 |
| 2017/0308989 A1* | 10/2017 | Lee | H04N 5/23267 |
| 2018/0012492 A1* | 1/2018 | Baldwin | B60W 10/18 |
| 2018/0120857 A1* | 5/2018 | Kappauf | G01S 17/86 |
| 2018/0137336 A1* | 5/2018 | Shoda | G06K 9/6227 |
| 2018/0239032 A1* | 8/2018 | Thiel | G01S 19/48 |
| 2018/0240335 A1* | 8/2018 | Dong | G08G 1/04 |
| 2018/0246907 A1* | 8/2018 | Thiel | G01C 21/32 |
| 2018/0286233 A1* | 10/2018 | Suzuki | G08G 1/096783 |
| 2018/0300880 A1* | 10/2018 | Fan | G06T 7/11 |
| 2019/0003847 A1 | 1/2019 | Song et al. | |
| 2019/0033867 A1 | 1/2019 | Sharma | |
| 2019/0035276 A1* | 1/2019 | Zruya | G06K 9/00818 |
| 2019/0137287 A1* | 5/2019 | Pazhayampallil | G05D 1/0291 |
| 2019/0146520 A1 | 5/2019 | Naithani et al. | |
| 2019/0147257 A1* | 5/2019 | Lindemann | G06K 9/00818 382/103 |
| 2019/0205674 A1* | 7/2019 | Silver | G05D 1/0223 |
| 2019/0272435 A1* | 9/2019 | Kundu | G06K 9/00818 |
| 2019/0294898 A1* | 9/2019 | Jin | B60W 40/02 |
| 2019/0319793 A1* | 10/2019 | Schooler | H04W 4/38 |
| 2019/0325237 A1* | 10/2019 | Zhang | G08G 1/09623 |
| 2019/0325238 A1* | 10/2019 | Prakah-Asante | B60W 50/14 |
| 2019/0325736 A1* | 10/2019 | Zhang | G06K 9/00818 |
| 2019/0370573 A1* | 12/2019 | Duan | H04W 4/029 |
| 2019/0382004 A1* | 12/2019 | Golov | G06K 9/00791 |
| 2019/0391582 A1* | 12/2019 | Jung | B60W 60/0015 |
| 2020/0003566 A1* | 1/2020 | Hosokawa | G06K 9/00798 |
| 2020/0017104 A1* | 1/2020 | Togawa | B60W 30/12 |
| 2020/0018604 A1* | 1/2020 | Zhang | G06K 9/00818 |
| 2020/0019639 A1* | 1/2020 | Zhang | G06F 16/285 |
| 2020/0034988 A1* | 1/2020 | Zhou | H04N 17/002 |
| 2020/0045260 A1* | 2/2020 | Averhart | B60R 1/00 |
| 2020/0057155 A1* | 2/2020 | Achour | G01S 13/02 |
| 2020/0124012 A1* | 4/2020 | Lee | F02N 11/0822 |
| 2020/0192397 A1* | 6/2020 | Zhang | G06K 9/6218 |
| 2020/0193194 A1* | 6/2020 | Zhang | B60W 50/0098 |
| 2020/0217667 A1* | 7/2020 | Kim | G06T 3/0031 |
| 2020/0242377 A1* | 7/2020 | He | G06K 9/00818 |
| 2020/0307563 A1* | 10/2020 | Ghafarianzadeh | B60W 60/00274 |
| 2020/0320676 A1* | 10/2020 | Hardy | G08G 1/09623 |
| 2020/0363217 A1* | 11/2020 | Zhang | G01C 21/3694 |
| 2020/0370894 A1* | 11/2020 | Kim | G01C 21/3602 |
| 2021/0041883 A1* | 2/2021 | Bansal | G06T 7/55 |

FOREIGN PATENT DOCUMENTS

| | | |
|---|---|---|
| WO | WO 2018/063245 A1 | 4/2018 |
| WO | WO 2019/135537 A1 | 7/2019 |

OTHER PUBLICATIONS

Theodosis, P. et al., EE368 Final Project; Road Sign Detection and Distance Estimation in Autonomous Car Application, [online] [retrieved Feb. 4, 2020]. Retrieved via the Internet: https://web.standord.edu/class/ee368/Project_Autumn1314/index.html (2013-2014) 11 pages.
Yoshida, J., Autonomous Vehicles Driving New Data Interfaces—EE Times Asia [online] [retrieved Feb. 4, 2020]. Retrieved via the Internet: https://www.eetasia.com/news/article/18081001-autonomous-vehicles-driving-new-data-interfaces (Aug. 2018) 8 pages.
Self-driving car—Wikipedia [online] [retrieved Feb. 7, 2020]. Retrieved via the Internet: https://web.archive.org/web/20191118190620/http://en.wikipedia.org/wiki/Self-driving_car (Nov. 18, 2019) 45 pages.
Extended European Search Report for European Application No. 20209007.2 dated Aug. 4, 2021, 12 pages.

* cited by examiner

METHOD AND APPARATUS FOR ESTIMATING A LOCATION OF A VEHICLE

TECHNOLOGICAL FIELD

An example embodiment relates generally to a method, apparatus and computer program product for estimating the location of a vehicle and, more particularly, to a method, apparatus and computer program product for estimating the location of a vehicle at least partly based upon two or more road signs that are depicted in an image captured from onboard the vehicle.

BACKGROUND

In order to provide for navigation of vehicles, the location of a vehicle must be known or estimated with sufficient accuracy. In this regard, the location of the vehicle includes the road segment upon which the vehicle is traveling and, in some instances, the lane of the road segment in which the vehicle is traveling. For example, the navigation of autonomous vehicles generally relies upon knowledge of the location of the vehicle including the road segment and the lane of the road segment in which the vehicle is traveling. Based upon the location of the vehicle, a vehicle, such as an autonomous vehicle, may be navigated along a road network from an origin to a destination, such as based upon the current location of the vehicle and traffic information for the road segment along which the vehicle is traveling, such as provided by one or more traffic service providers.

Vehicles, such as autonomous vehicles, are capable of identifying their location in line-of-sight situations utilizing satellite-based navigation and then map matching their location to a road segment defined by a map. For example, an autonomous vehicle may include a global navigation satellite system (GNSS) receiver that interacts with a global positioning system (GPS), a global navigation satellite system (GLONASS), a Galileo navigation satellite system or a BeiDou navigation satellite system. The GNSS receiver receives signals from a plurality of satellites, such as four or more satellites, and determines the location of the vehicle utilizing, for example, a triangulation method. In instances in which the GNSS receiver of an autonomous vehicle maintains a line-of-sight with the satellites, the location that the vehicle may be determined with sufficient accuracy so as to satisfy many applications. As additional navigation satellite systems are placed in commercial service in the future, a combination of navigation satellite systems may be utilized in order to provide more accurate location estimation for an autonomous vehicle so long as the GNSS receiver maintains a line-of-sight with the respective satellites.

In some situations, however, the GNSS receiver can no longer maintain a line-of-sight with the satellites and, as such, may not provide a stable and accurate estimate of the location of the vehicle. For example, the GNSS receivers carried by vehicles driving through urban canyons in downtown areas in which a vehicle is surrounded by tall buildings or vehicles driving in a forested region may be unable to maintain a line-of-sight with the navigation system satellites and prevent stable location estimation. In such situations, the vehicle may include a radio frequency (RF) receiver to receive radio signals from which the location the vehicle may be estimated. These RF signals may include cellular signals, such as global system for mobile communications (GSM) signals, wideband code division multiple access (WCDMA) signals, long term evolution (LTE) signals, wireless local area network (WLAN) signals and/or Bluetooth signals. In combination, these various types of radio signals may be analyzed to estimate location of the RF receiver and, in turn, the vehicle carrying the RF receiver. However, the location may only be estimated with an accuracy of about 50 meters and, in instances in which only cellular signals are utilized, the accuracy of the location estimation degrades to hundreds of meters or even more. Such location estimation is generally insufficient for purposes of establishing the location of a vehicle for navigational purposes as the limited accuracy may prevent the road segment on which the vehicle is traveling from being identified with sufficient confidence and, in any event, may prevent the lane of the road segment upon which the vehicle is traveling from being identified since the width of many vehicle lanes is typically four meters or less. Other sensors, such as inertial measurement units (IMUs) can increase the accuracy of localization by taking into account vehicle movement, but these sensors may drift and fail to provide sufficient accuracy to ensure maximum safety. As such, navigation of a vehicle, such as an autonomous vehicle for which navigation requires localization accuracy to within, for example, 10 centimeters, may be limited in instances in which the GNSS receiver cannot maintain a line-of-sight with the navigation system satellites.

BRIEF SUMMARY

A method, apparatus and computer program product are provided in accordance with an example embodiment in order to estimate the location of a vehicle. In this regard, the location of a vehicle is estimated based at least in part upon two or more road signs that are depicted by one or more images captured by one or more image capture devices onboard the vehicle. By relying at least in part upon the two or more road signs, the location of the vehicle may be estimated with enhanced accuracy in at least some situations, such as in instances in which a GNSS receiver is unable to maintain a line-of-sight with the satellites of a satellite positioning system or otherwise in instances in which the location estimated based upon reliance on satellite or radio signals is considered insufficient. By estimating the location of the vehicle with enhanced accuracy in at least some situations, the vehicle may be navigated in a more informed and reliable manner and the relationship of the vehicle to other vehicles traveling along the same or proximate road segments may be determined with greater confidence.

In an example embodiment, a method is provided for estimating a location of a vehicle. Based upon one or more images obtained by one or more image capture devices onboard the vehicle, the method determines respective distances between the vehicle and each of two or more road signs depicted by the one or more images. The method also identifies a distance between the two or more road signs. The method further includes estimating the location of the vehicle based upon the respective distances between the vehicle and each of the two or more road signs depicted by the one or more images and also based upon the distance between the two or more road signs.

The method of an example embodiment also includes estimating an initial location of the vehicle based upon satellite, cellular or other radio signals and then determining a road segment upon which the vehicle is traveling based upon the initial location and map information including a representation of the road segment. The method of this example embodiment also includes determining a lane of the road segment in which the vehicle is traveling based upon at least one of radio detection and ranging (RADAR) or light detection and ranging (LIDAR) data. In this example embodiment, the method estimates the location of the vehicle by refining the location of the vehicle within the lane of the road segment based upon the respective distances between the vehicle and each of the two or more road signs depicted by the one or more images and also based upon the distance between the two or more road signs.

The method of an example embodiment determines distances between the vehicle and each of the two or more road signs by identifying each of the two or more road signs depicted by the one or more images based upon information regarding the two or more road signs. In this example embodiment, the information regarding the two or more road signs may include information regarding an appearance of the road signs in different countries or regions. The method of an example embodiment also includes training a model with an edge computing apparatus in order to identify each of the two or more road signs and causing the model to be provided to a computing device onboard the vehicle to permit identification of each of the two or more road signs.

In another example embodiment, an apparatus is provided for estimating a location of a vehicle. The apparatus includes processing circuitry and at least one non-transitory memory including computer program code instructions with the computer program code instructions configured to, when executed by the processing circuitry, cause the apparatus to determine, based upon one or more images obtained by one or more image capture devices onboard the vehicle, respective distances between the vehicle and each of two or more road signs depicted by the one or more images. The computer program code instructions are also configured to, when executed by the processing circuitry, cause the apparatus to identify a distance between the two or more road signs. The computer program code instructions are further configured to, when executed by the processing circuitry, cause the apparatus to estimate the location of the vehicle based upon the respective distances between the vehicle and each of the two or more road signs depicted by the one or more images and also based upon the distance between the two or more road signs.

The computer program code instructions of an example embodiment are also configured to, when executed by the processing circuitry, cause the apparatus to estimate an initial location of the vehicle based upon satellite, cellular or other radio signals and to then determine a road segment upon which the vehicle is traveling based upon the initial location and map information including a representation of the road segment. The computer program code instructions of this example embodiment are also configured to, when executed by the processing circuitry, cause the apparatus to determine a lane of the road segment in which the vehicle is traveling based upon at least one of radio detection and ranging (RADAR) or light detection and ranging (LIDAR) data. In this example embodiment, the apparatus is caused to estimate the location of the vehicle by refining the location of the vehicle within the lane of the road segment based upon the respective distances between the vehicle and each of the two or more road signs depicted by the one or more images and also based upon the distance between the two or more road signs.

The apparatus of an example embodiment is caused to determine distances between the vehicle and each of the two or more road signs by identifying each of the two or more road signs depicted by the one or more images based upon information regarding the two or more road signs. In this example embodiment, the information regarding the two or more road signs m ay include information regarding an appearance of the road signs in different countries or regions.

In a further example embodiment, a computer program product is provided for estimating a location of a vehicle. The computer program product includes at least one non-transitory computer-readable storage medium having computer-executable program code instructions stored therein with the computer-executable program code instructions configured to determine, based upon one or more images obtained by one or more image capture devices onboard the vehicle, respective distances between the vehicle and each of two or more road signs depicted by the one or more images. The computer-executable program code instructions are also configured to identify a distance between the two or more road signs. The computer-executable program code instructions are further configured to estimate the location of the vehicle based upon the respective distances between the vehicle and each of the two or more road signs depicted by the one or more images and also based upon the distance between the two or more road signs.

The computer-executable program code instructions of an example embodiment are also configured to estimate an initial location of the vehicle based upon satellite, cellular or other radio signals and then to determine a road segment upon which the vehicle is traveling based upon the initial location and map information including a representation of the road segment. The computer-executable program code instructions of this example embodiment are also configured to determine a lane of the road segment in which the vehicle is traveling based upon at least one of radio detection and ranging (RADAR) or light detection and ranging (LIDAR) data. In this example embodiment, the computer-executable program code instructions configured to estimate the location of the vehicle include computer-executable program code instructions configured to refine the location of the vehicle within the lane of the road segment based upon the respective distances between the vehicle and each of the two or more road signs depicted by the one or more images and also based upon the distance between the two or more road signs.

In an example embodiment, the computer-executable program code instructions configured to determine distances between the vehicle and each of the two or more road signs include computer-executable program code instructions configured to identify each of the two or more road signs depicted by the one or more images based upon information regarding the two or more road signs. In this example embodiment, the information regarding the two or more road signs may include information regarding an appearance of the road signs in different countries or regions.

In yet another example embodiment, an apparatus is provided for estimating a location of a vehicle. Based upon one or more images obtained by one or more image capture devices onboard the vehicle, the apparatus includes means for determining respective distances between the vehicle and each of two or more road signs depicted by the one or more images. The apparatus also includes means for identifying a distance between the two or more road signs. The apparatus further includes means for estimating the location of the vehicle based upon the respective distances between the vehicle and each of the two or more road signs depicted by the one or more images and also based upon the distance between the two or more road signs.

The apparatus of an example embodiment also includes means for estimating an initial location of the vehicle based upon satellite, cellular or other radio signals and means for determining a road segment upon which the vehicle is traveling based upon the initial location and map information including a representation of the road segment. The apparatus of this example embodiment also includes means for determining a lane of the road segment in which the vehicle is traveling based upon at least one of radio detection and ranging (RADAR) or light detection and ranging (LIDAR) data. In this example embodiment, the means for estimating the location of the vehicle includes means for refining the location of the vehicle within the lane of the road segment based upon the respective distances between the vehicle and each of the two or more road signs depicted by the one or more images and also based upon the distance between the two or more road signs.

In an example embodiment, the means for determining distances between the vehicle and each of the two or more road signs includes means for identifying each of the two or more road signs depicted by the one or more images based upon information regarding the two or more road signs. In this example embodiment, the information regarding the two or more road signs may include information regarding an appearance of the road signs in different countries or regions.

In an example embodiment, a method is provided for estimating a location of a vehicle. Based upon one or more images obtained by one or more image capture devices onboard the vehicle, the method determines respective distances between the vehicle and each of the two or more road signs depicted by the one or more images. In this example embodiment, the two or more road signs are positioned on opposite sides of a road on which the vehicle is traveling. The method also includes accessing information defining respective locations of a plurality of road signs including the two or more road signs. The method further includes estimating the location the vehicle based upon the respective distances between the vehicle and each of the two or more road signs depicted by the one or more images and also based upon the respective locations of the two or more road signs.

The method of an example embodiment also includes detecting a road sign that is missing based upon the one or more images and the information defining respective locations of the plurality of road signs that would place the road sign that is missing within the one or more images. In an example embodiment, the method estimates the location the vehicle by employing a centroid technique to estimate the location of the vehicle based upon the respective distances between the vehicle and each of the two or more road signs depicted by the one or more images and also based upon the respective locations of the two or more road signs. In an example embodiment, the method determines respective distances between the vehicle and each of the two or more road signs by identifying each of the two or more road signs depicted by the one or more images based upon information regarding the two or more road signs. In this example embodiment, the information regarding the two or more road signs may include information regarding an appearance of the road signs in different countries or regions.

The method of an example embodiment also includes estimating an initial location of the vehicle based upon satellite, cellular or other radio signals and then determining a road segment upon which the vehicle is traveling based upon the initial location and map information including a representation of the road segment. The method of this example embodiment also includes determining a lane of the road segment in which the vehicle is traveling based upon at least one of radio detection and ranging (RADAR) or light detection and ranging (LIDAR) data. In this example embodiment, the method estimates the location of the vehicle by refining the location the vehicle within the lane of the road segment based upon the respective distances between the vehicle and each of the two or more road signs depicted by the one or more images and also based upon the respective locations of the two or more road signs. The method of an example embodiment also includes training a model with an edge computing apparatus in order to identify each of the two or more road signs and causing the model to be provided to a computing device onboard the vehicle to permit identification of each of the two or more road signs.

In another example embodiment, an apparatus is provided for estimating a location of a vehicle. The apparatus includes processing circuitry and at least one non-transitory memory including computer program code instructions with the computer program code instructions configured to, when executed by the processing circuitry, cause the apparatus to determine, based upon one or more images obtained by one or more image capture devices onboard the vehicle, respective distances between the vehicle and each of two or more road signs depicted by the one or more images. In this example embodiment, the two or more road signs are positioned on opposite sides of a road on which the vehicle is traveling. The computer program code instructions are also configured to, when executed by the processing circuitry, cause the apparatus to access information defining respective locations of a plurality of road signs including the two or more road signs. The computer program code instructions are further configured to, when executed by the processing circuitry, cause the apparatus to estimate the location the vehicle based upon the respective distances between the vehicle and each of the two or more road signs depicted by the one or more images and also based upon the respective locations of the two or more road signs.

The computer program code instructions of an example embodiment are also configured to, when executed by the processing circuitry, cause the apparatus to detect a road sign that is missing based upon the one or more images and the information defining respective locations of the plurality of road signs that would place the road sign that is missing within the one or more images. In an example embodiment, the apparatus is caused to estimate the location of the vehicle by employing a centroid technique to estimate the location the vehicle based upon the respective distances between the vehicle and each of the two or more road signs depicted by the one or more images and also based upon the respective locations of the two or more road signs. In an example embodiment, the apparatus is caused to determine respective distances between the vehicle and each of the two or more road signs by identifying each of the two or more road signs depicted by the one or more images based upon information regarding the two or more road signs. In this example embodiment, the information regarding the two or more road signs may include information regarding an appearance of the road signs in different countries or regions.

The computer program code instructions of an example embodiment are also configured to, when executed by the processing circuitry, cause the apparatus to estimate an initial location of the vehicle based upon satellite, cellular or other radio signals and then determine a road segment upon which the vehicle is traveling based upon the initial location and map information including a representation of the road segment. The computer program code instructions of this example embodiment are also configured to, when executed by the processing circuitry, cause the apparatus to determine a lane of the road segment in which the vehicle is traveling based upon at least one of radio detection and ranging (RADAR) or light detection and ranging (LIDAR) data. In this example embodiment, the apparatus is caused to estimate the location of the vehicle by refining the location the vehicle within the lane of the road segment based upon the respective distances between the vehicle and each of the two or more road signs depicted by the one or more images and also based upon the respective locations of the two or more road signs.

In a further example embodiment, a computer program product is provided for estimating a location of a vehicle. The computer program product includes at least one non-transitory computer-readable storage medium having computer-executable program code instructions stored therein with the computer-executable program code instructions configured to determine, based upon one or more images obtained by one or more image capture devices onboard the vehicle, respective distances between the vehicle and each of two or more road signs depicted by the one or more images. In this example embodiment, the two or more road signs are positioned on opposite sides of a road on which the vehicle is traveling. The computer-executable program code instructions are also configured to access information defining respective locations of a plurality of road signs including the two or more road signs. The computer-executable program code instructions are further configured to estimate the location of the vehicle based upon the respective distances between the vehicle and each of the two or more road signs depicted by the one or more images and also based upon the respective locations of the two or more road signs.

The computer-executable program code instructions of an example embodiment are also configured to detect a road sign that is missing based upon the one or more images and the information defining respective locations of the plurality of road signs that would place the road sign that is missing within the one or more images. In an example embodiment, the computer-executable program code instructions are configured to estimate the location of the vehicle by employing a centroid technique to estimate the location the vehicle based upon the respective distances between the vehicle and each of the two or more road signs depicted by the one or more images and also based upon the respective locations of the two or more road signs. In an example embodiment, the computer-executable program code instructions configured to determine respective distances between the vehicle and each of the two or more road signs include computer-executable program code instructions configured to identify each of the two or more road signs depicted by the one or more images based upon information regarding the two or more road signs. In this example embodiment, the information regarding the two or more road signs may include information regarding an appearance of the road signs in different countries or regions.

The computer-executable program code instructions of an example embodiment are also configured to estimate an initial location of the vehicle based upon satellite, cellular or other radio signals and to then determine a road segment upon which the vehicle is traveling based upon the initial location and map information including a representation of the road segment. The computer-executable program code instructions of this example embodiment are also configured to determine a lane of the road segment in which the vehicle is traveling based upon at least one of radio detection and ranging (RADAR) or light detection and ranging (LIDAR) data. In this example embodiment, the computer-executable program code instructions configured to estimate the location of the vehicle include computer-executable program code instructions configured to refine the location the vehicle within the lane of the road segment based upon the respective distances between the vehicle and each of the two or more road signs depicted by the one or more images and also based upon the respective locations of the two or more road signs.

In yet another example embodiment, an apparatus is provided for estimating a location of a vehicle. Based upon one or more images obtained by one or more image capture devices onboard the vehicle, the apparatus includes means for determining respective distances between the vehicle and each of two or more road signs depicted by the one or more images. In this example embodiment, the two or more road signs are positioned on opposite sides of a road on which the vehicle is traveling. The apparatus also includes means for accessing information defining respective locations of a plurality of road signs including the two or more road signs. The apparatus further includes means for estimating the location the vehicle based upon the respective distances between the vehicle and each of the two or more road signs depicted by the one or more images and also based upon the respective locations of the two or more road signs.

The apparatus of an example embodiment also includes means for detecting a road sign that is missing based upon the one or more images and the information defining respective locations of the plurality of road signs that would place the road sign that is missing within the one or more images. In an example embodiment, the means for estimating the location of the vehicle employs a centroid technique to estimate the location the vehicle based upon the respective distances between the vehicle and each of the two or more road signs depicted by the one or more images and also based upon the respective locations of the two or more road signs. In an example embodiment, the means for determining respective distances between the vehicle and each of the two or more road signs includes means for identifying each of the two or more road signs depicted by the one or more images based upon information regarding the two or more road signs. In this example embodiment, the information regarding the two or more road signs may include information regarding an appearance of the road signs in different countries or regions.

The apparatus of an example embodiment also includes means for estimating an initial location of the vehicle based upon satellite, cellular or other radio signals and means for determining a road segment upon which the vehicle is traveling based upon the initial location and map information including a representation of the road segment. The apparatus of this example embodiment also includes means for determining a lane of the road segment in which the vehicle is traveling based upon at least one of radio detection and ranging (RADAR) or light detection and ranging (LIDAR) data. In this example embodiment, the means for estimating the location of the vehicle includes means for refining the location the vehicle within the lane of the road segment based upon the respective distances between the vehicle and each of the two or more road signs depicted by the one or more images and also based upon the respective locations of the two or more road signs.

BRIEF DESCRIPTION OF THE DRAWINGS

Figure 1:
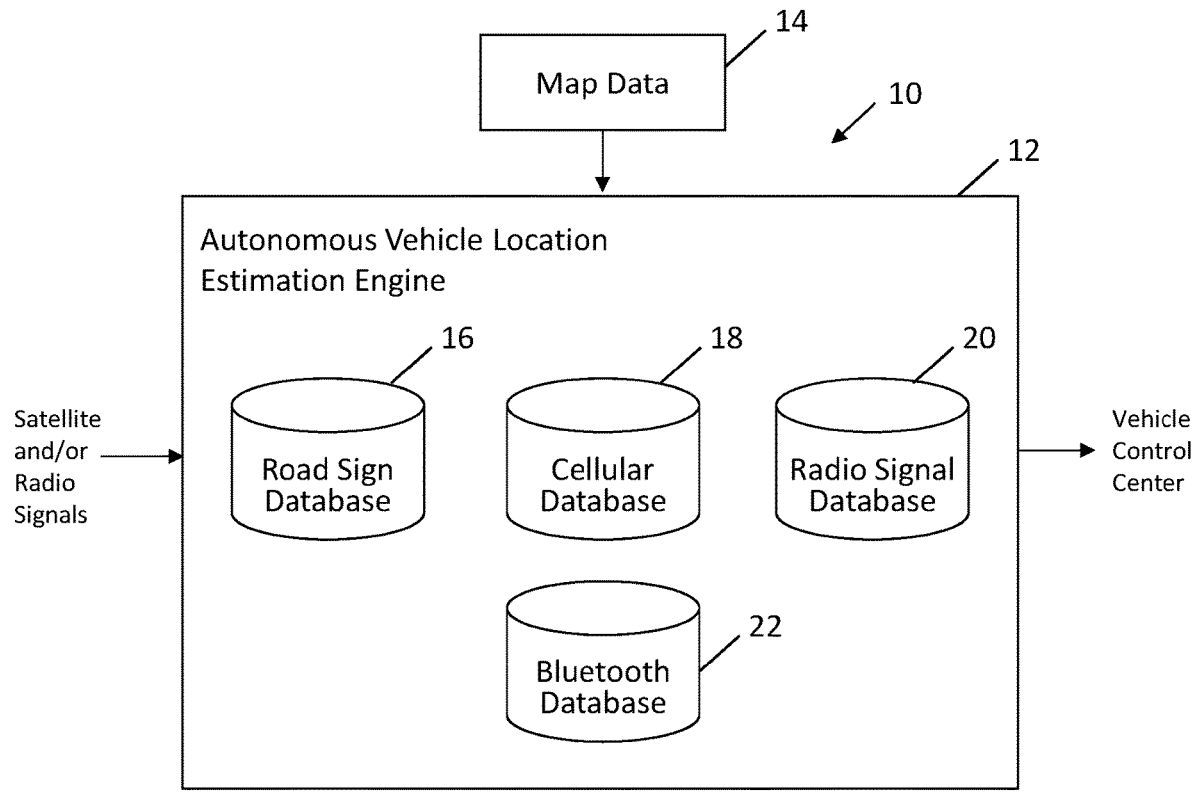
Figure 2:
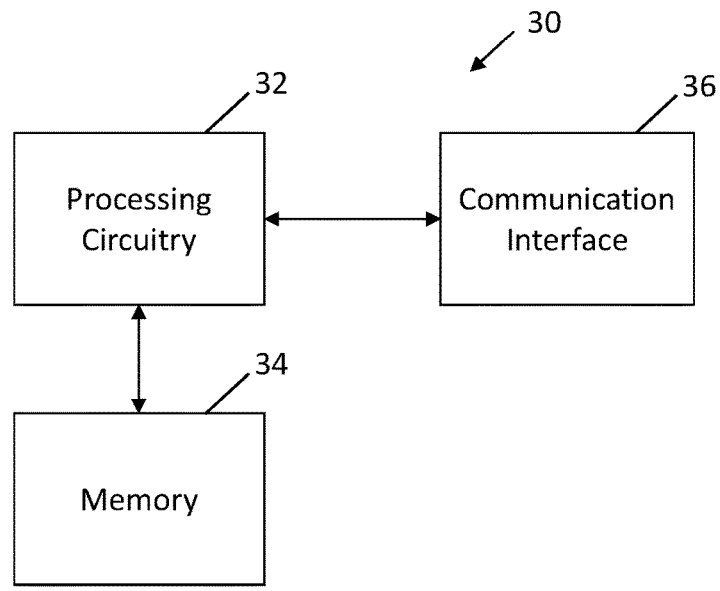
Figure 3:
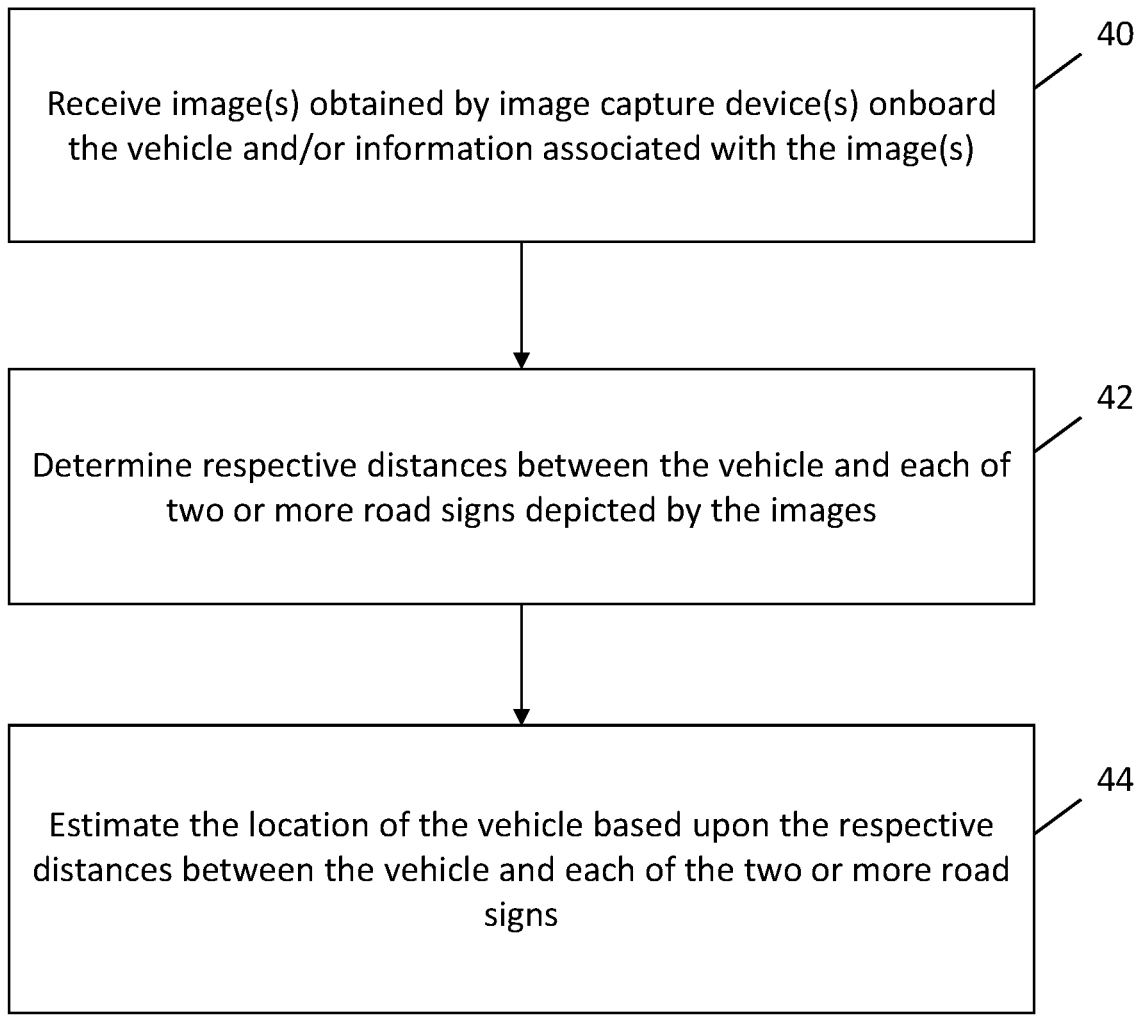
Figure 4:
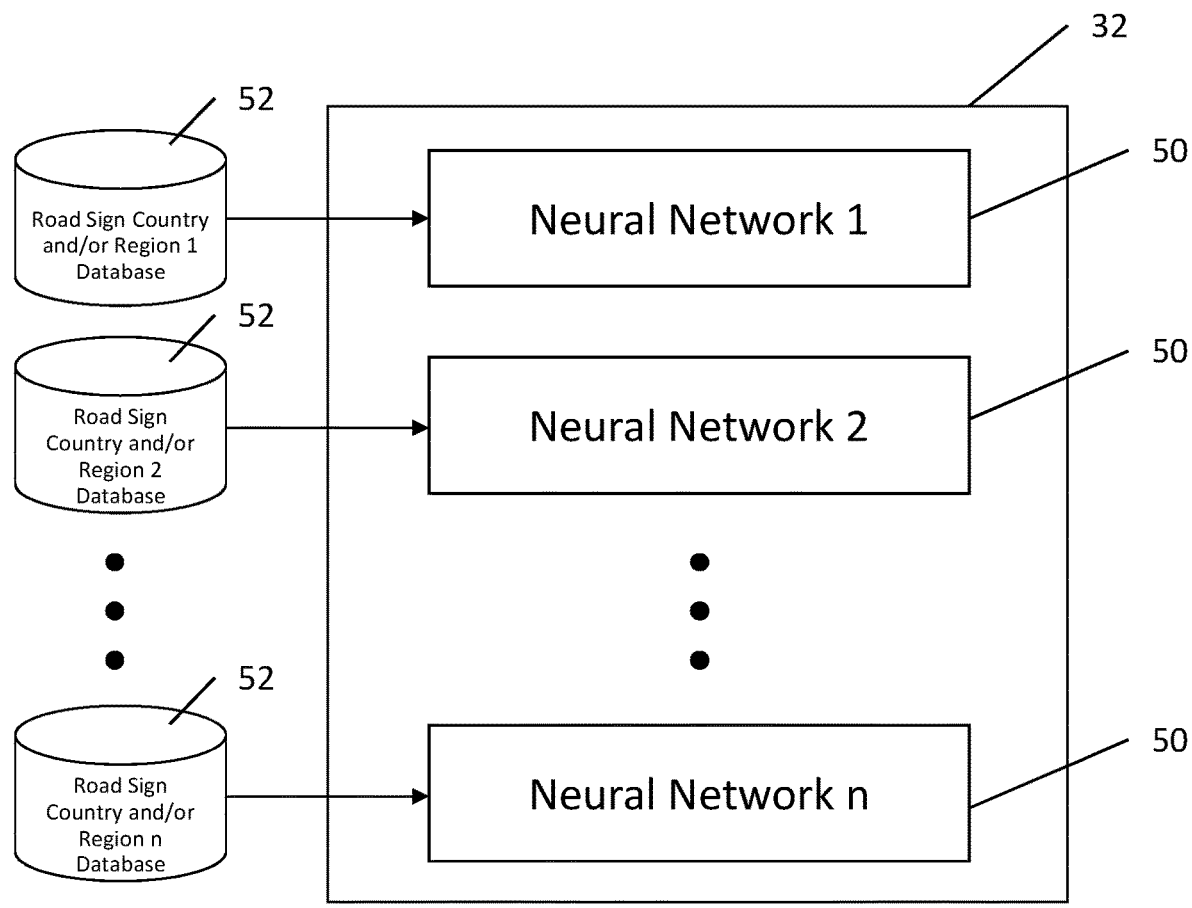
Figure 5A:
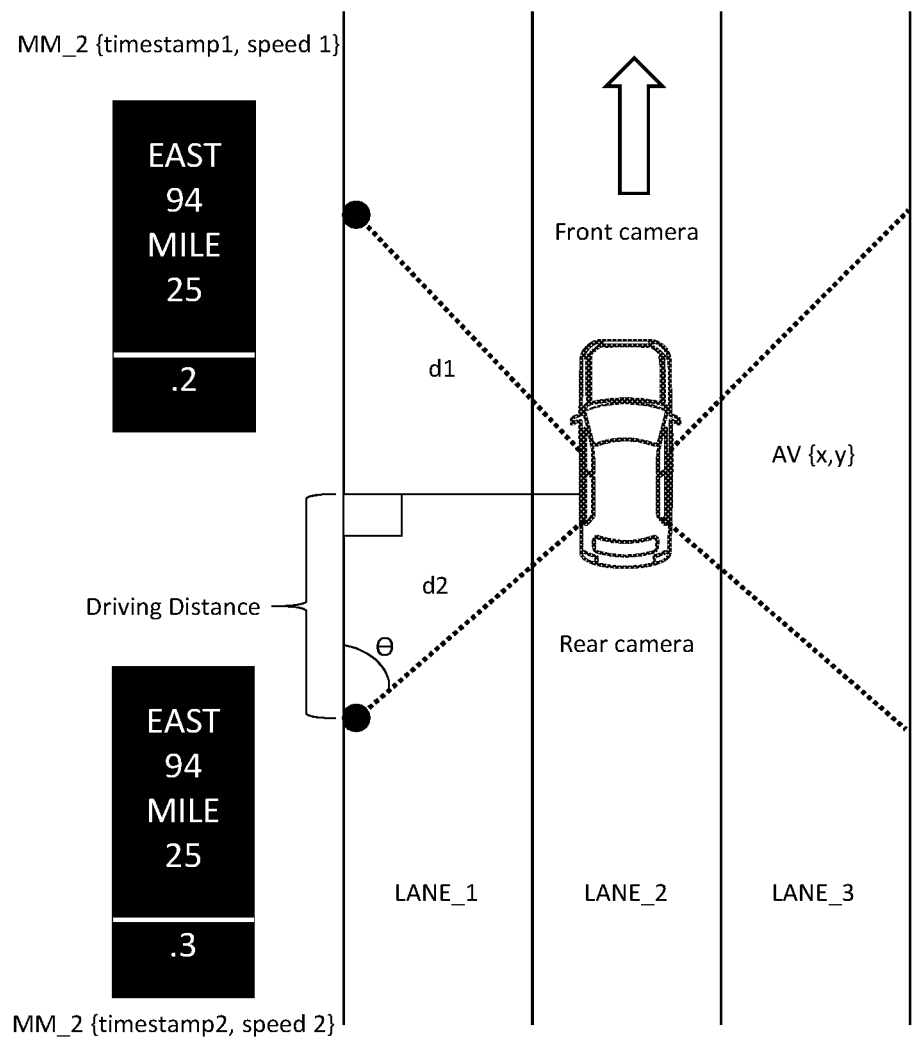
Figure 5B:
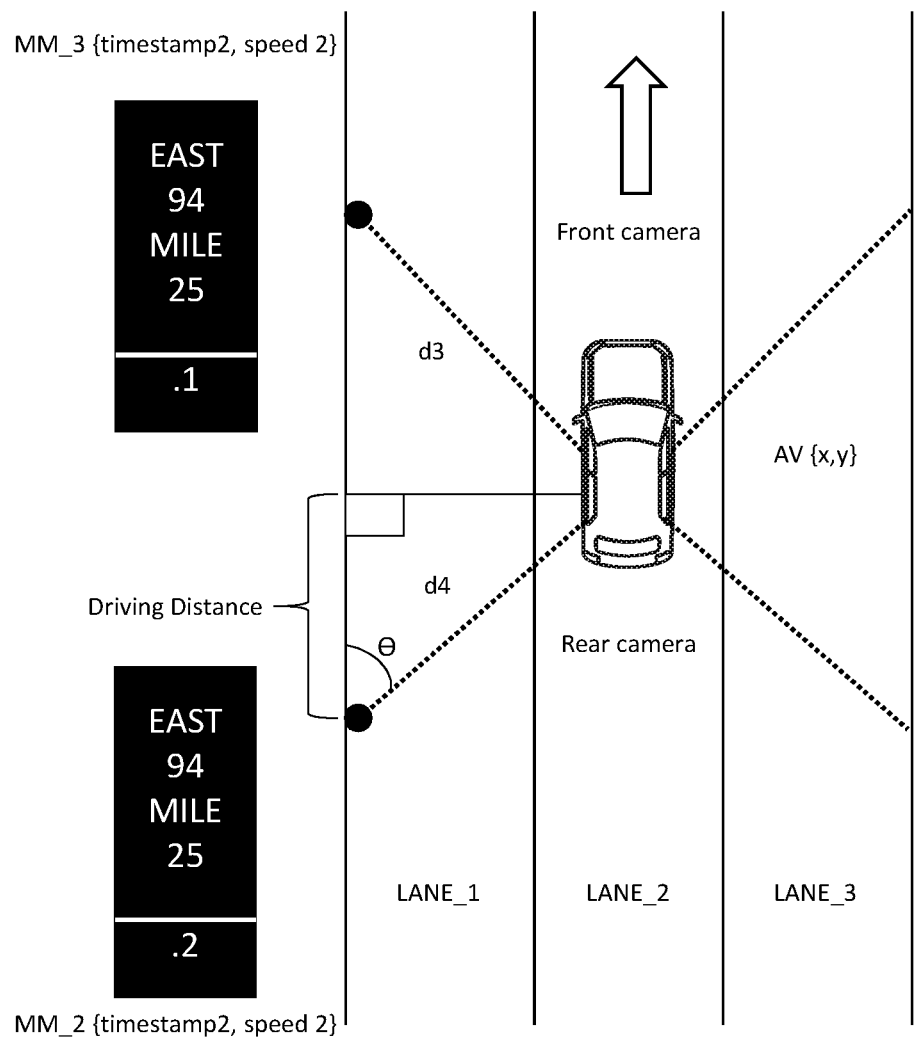
Figure 6:
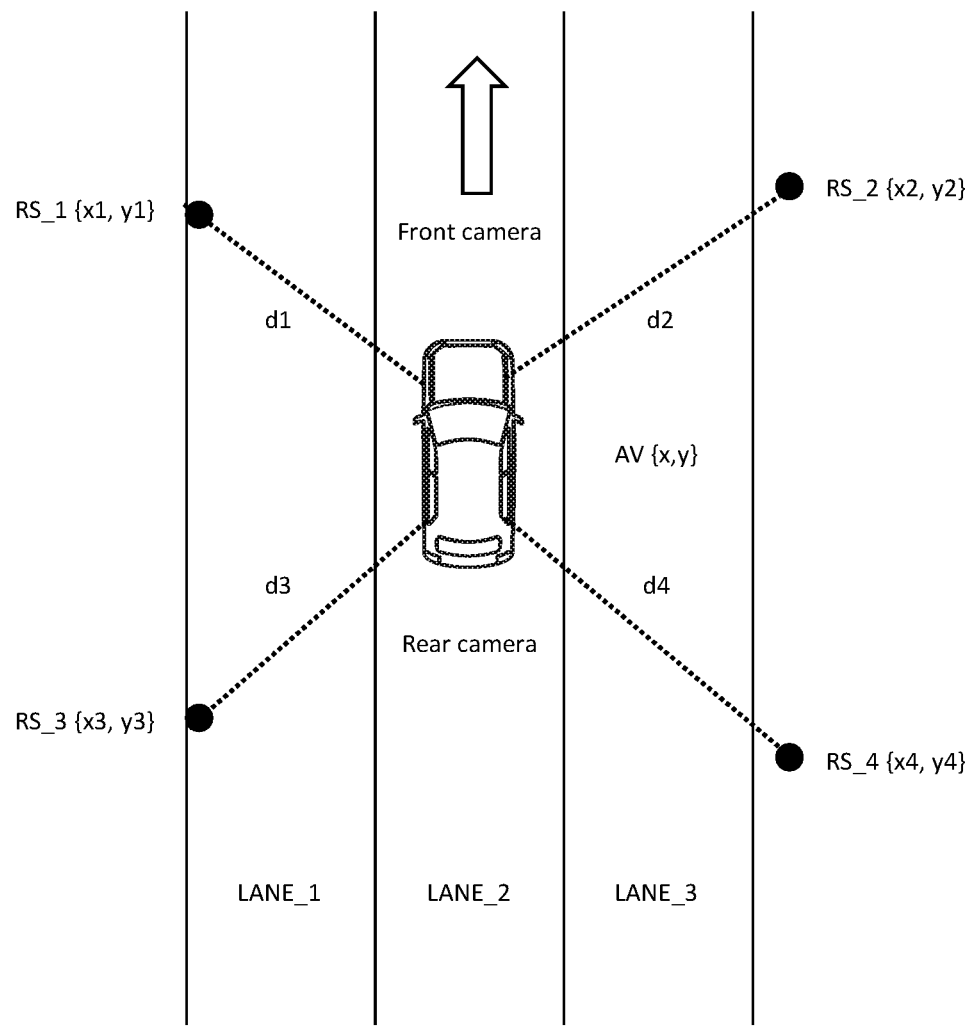
Figure 7:
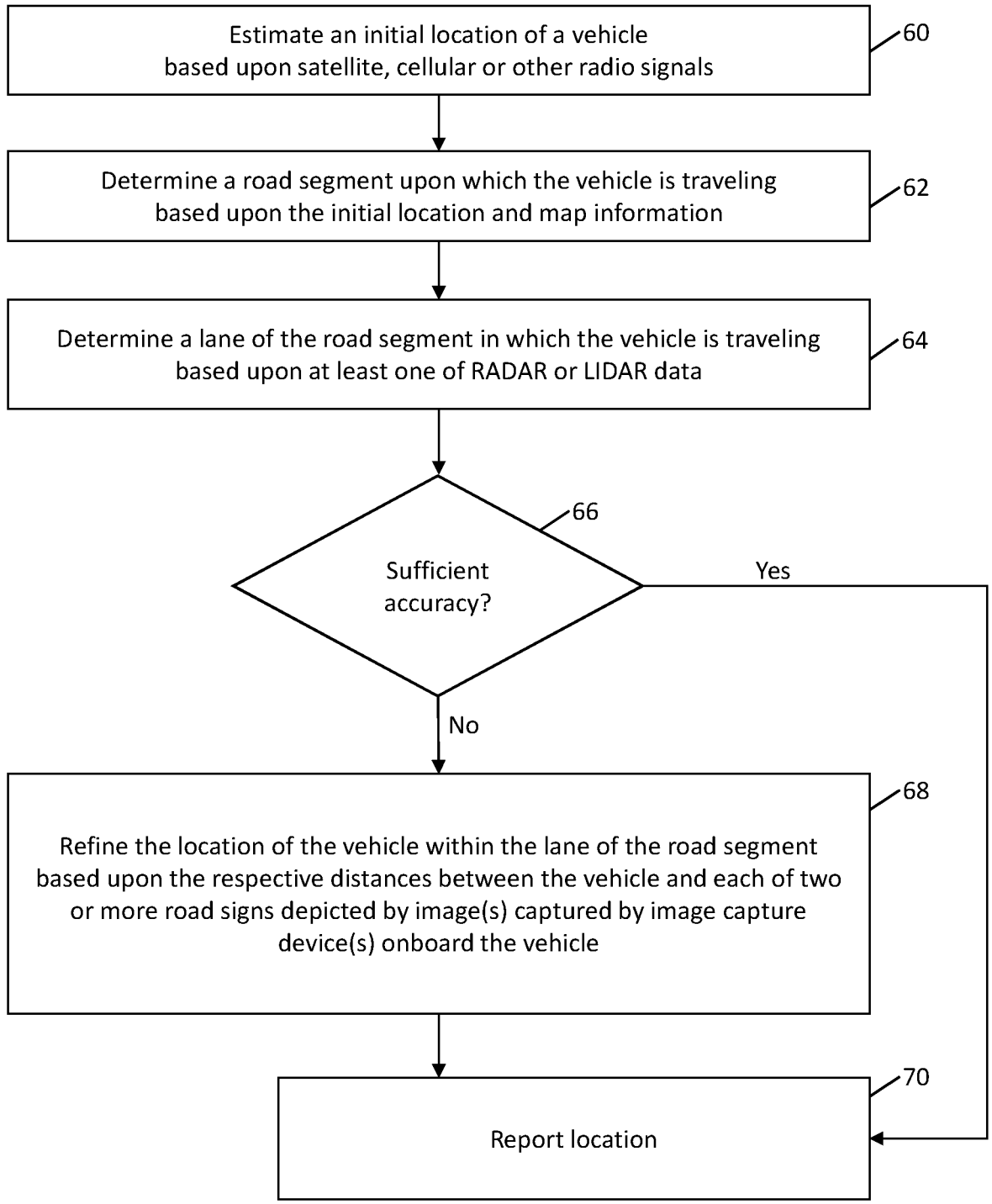

Having thus described certain embodiments of the invention in general terms, reference will now be made to the accompanying drawings, which are not necessarily drawn to scale, and wherein:

FIG. 1 is a block diagram of a system that may be specifically configured to estimate the location of a vehicle in accordance with an example embodiment of the present disclosure;

FIG. 2 is an apparatus that may be specifically configured in accordance with an example embodiment of the present disclosure in order to estimate the location of a vehicle and which may embody, for example, the autonomous vehicle location estimation engine of FIG. 1;

FIG. 3 illustrates the operations performed, such as by the apparatus of FIG. 2, in order to estimate the location of a vehicle in accordance with an example embodiment of the present disclosure;

FIG. 4 is a block diagram of the processing circuitry in communication with a plurality of databases having information regarding the appearance of road signs in different countries or regions that may be utilized in conjunction with an example embodiment of the present disclosure;

FIGS. 5A and 5B illustrate the location of a vehicle relative to two road signs at first and second instances of time, respectively;

FIG. 6 illustrates the location of a vehicle relative to four road signs, two of which are positioned on opposite sides of the road; and FIG. 7 is a flow chart illustrating operations performed, such as by the apparatus of FIG. 2, in accordance with an example embodiment of the present disclosure in order to refine the location of a vehicle that was initially determined based upon satellite, cellular or other radio signals with reference to each of two or more road signs depicted by one or more images captured by one or more image capture devices onboard the vehicle.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to estimate the location of a vehicle, such as an autonomous vehicle. In this regard, the method, apparatus and computer program product may estimate the location of a vehicle based at least in part upon two or more road signs depicted in one or more images captured by one or more image capture devices onboard the vehicle. In some embodiments, the location of the vehicle is not based solely upon the two or more road signs in one or more images captured by the one or more image capture devices onboard the vehicle and, instead, the method, apparatus and computer program product implement a hybrid approach to estimate the location of the vehicle. In conjunction with this hybrid approach, the one or more road signs depicted by the one or more images captured by the one or more image capture devices onboard the vehicle serve to refine a location that was initially estimated based upon satellite, cellular or other radio signals. By relying at least in part upon two or more road signs from one or more images captured by one or more image capture devices onboard the vehicle, the location of the vehicle may be estimated more accurately, thereby providing for increased confidence in and reliability of the navigation of the vehicle. In this regard, the vehicle may be an autonomous vehicle and the increased accuracy with which the location of the autonomous vehicle is estimated may improve the confidence with which the autonomous vehicle and/or other vehicles in the vicinity of the autonomous vehicle may be navigated.

By way of example, a system 10 configured to estimate the location of a vehicle, such as, but not limited to an autonomous vehicle, is depicted in FIG. 1. As shown, the system of this example embodiment includes an autonomous vehicle location estimation engine 12 that is configured to estimate the location of a vehicle. The autonomous vehicle location estimation engine may be onboard and embodied by a computing device carried by the autonomous vehicle. For example, the autonomous vehicle location estimation engine may be embodied by the engine control module (ECM) of the autonomous vehicle. Alternatively, the autonomous vehicle location estimation engine may be offboard, but in communication with the autonomous vehicle, such as in instances in which an edge computing device embodies the autonomous vehicle location estimation engine.

The autonomous vehicle location estimation engine 12 receives information captured by one or more sensors. This information may include GPS or other navigation satellite system data captured by a GNSS or other satellite receiver onboard the vehicle. Additionally, or alternatively, the information received by the autonomous vehicle location estimation engine may include cellular, Wi-Fi, Bluetooth or other radio signals received by an RF receiver onboard the vehicle. Still further, the information received by the autonomous vehicle location estimation engine may additionally or alternatively include one or more images captured by one or more image capture devices, such as one or more cameras, onboard the vehicle and/or information regarding two or more road signs depicted by the one or more images captured by the one or more image capture devices onboard the vehicle in instances in which the images have been processed so as to identify the two or more road signs prior to provision of the information to the autonomous vehicle location estimation engine.

As indicated by the types of information provided to the autonomous vehicle location estimation engine 12, the vehicle for which the location is to be estimated may include one or more different types of sensors. For example, the vehicle may include a GNSS or other satellite receiver for receiving GPS, GLONASS, Galileo, BeiDou, Compass or other navigation satellite signals. Additionally, or alternatively, the autonomous vehicle may include an RF receiver configured to receive cellular signals, Wi-Fi signals, Bluetooth signals or other radio signals. Still further, the vehicle may include one or more image capture devices, such as cameras, including cameras for capturing still images and/or video recording devices for capturing video images. In this regard, the image capture devices may have fields of view that extend in various directions relative to the vehicle. For example, the image capture devices carried by the vehicle may include a front camera having a field of view that extends forward and to the sides of the vehicle and a rear camera having a field of view extends rearward and to the sides of the vehicle. The vehicle of other embodiments may carry additional cameras having different fields of view, such as fields of view to the opposed sides of the vehicle.

As also shown in FIG. 1, the system 10 for estimating the location of a vehicle also includes a source 14 of map data, such as high-definition map data defining road segment geometry for a road network. The autonomous vehicle location estimation engine 12 of this example embodiment may also include one or more databases including a road sign database 16. The road sign database identifies each of a plurality of road signs throughout the road network and identifies the location of each of the respective road signs. The road sign database may also include information describing the type of sign, the appearance of the sign or other indicia associated with the sign and from which a respective sign may be identified. In some embodiments, the autonomous vehicle location estimation engine also includes a cellular database 18 and/or a radio signal database 20. The cellular database provides information regarding cellular signals that are expected to be received at different locations throughout the road network, while the radio signal database provides information regarding radio signals that are expected to be received at different locations throughout the road network and may include information, for example, with respect to Wi-Fi signals, such as Wi-Fi beacon locations. Additionally, or alternatively, the autonomous vehicle location estimation engine may include a Bluetooth database 22 identifying the Bluetooth signals that are expected to be received at different locations throughout the road network, such as the location of each of a plurality of Bluetooth transmitters or beacons. Although illustrated so as to include the various databases, the autonomous vehicle location estimation engine need not include any one or more of the databases and may, instead, be in communication with one or more external databases.

The autonomous vehicle location estimation engine 12 of an example embodiment may also receive radio detection and ranging (RADAR) and/or light detection and ranging (LIDAR) data, such as from a radar system and/or a Lidar system carried by the vehicle. In this regard, the radar system carried by the vehicle may include a RADAR transmitter, a RADAR receiver and/or a RADAR transceiver and/or the LIDAR system may include a LIDAR transmitter, a LIDAR receiver and/or a LIDAR transceiver.

As shown in FIG. 1, the system 10 for estimating the location of a vehicle of this example embodiment may also be configured to communicate with an autonomous vehicle control center 22. In this regard, the autonomous vehicle location estimation engine 12 may estimate the location of the vehicle, such as in the manner described below, and may provide an indication of the estimated location to the autonomous vehicle control center. The autonomous vehicle control center may, in turn, track the location of the autonomous vehicle and may provide navigational directions to the autonomous vehicle and/or to other vehicles in the proximity of the autonomous vehicle based upon the location estimated for the autonomous vehicle.

Referring now to FIG. 2, an apparatus 30 is depicted that the may be specifically configured in order to estimate the location of a vehicle. In this regard, the apparatus may embody the autonomous vehicle location estimation engine 12 of FIG. 1 and may, in turn, be embodied by any of a variety of different computing devices including, for example, an edge computing device offboard the vehicle or a computing device onboard the vehicle, such as an ECM. With respect to computing devices that are offboard the vehicle, the apparatus may be embodied by an edge computing device which may, in one example embodiment, download a pretrained machine learning model (optionally including a neural network) to provide for the recognition of road signs. In this example embodiment, the edge computing device may download the pretrained machine learning model from a remote server, such as over the air or through an internet or other networked connection. Although the edge computing device may be configured to estimate the location of a vehicle, the edge computing device of an example embodiment collaborates with a computing device onboard the vehicle, such as the ECM, in that the edge computing device trains a model to identify road signs and then causes the model to be provided to a computing device onboard the vehicle, such as the ECM, to permit identification of each of the two or more road signs as described below. Regardless of the type of computing device that embodies the apparatus, the apparatus of this example embodiment includes, is associated with or is in communication with processing circuitry 32, memory 34 and communication interface 36.

In some embodiments, the processing circuitry 32 (and/or co-processors or any other processors assisting or otherwise associated with the processing circuitry) may be in communication with the memory device 34 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 32 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 30 of an example embodiment may also optionally include a communication interface 36 that may be any means such as a device or circuitry embodied in either hardware or a combination of hardware and software that is configured to receive and/or transmit data from/to other electronic devices in communication with the apparatus, such as a navigation system 20 or other consumer of map data. Additionally or alternatively, the communication interface may be configured to communicate in accordance with various wireless protocols including GSM, such as but not limited to LTE. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Referring now to FIG. 3, the operations performed, such as by the apparatus 30 of FIG. 2, in accordance with an example embodiment in order to determine the location of a vehicle are depicted. Referring now to block 40 of FIG. 3, one or more images are obtained by one or more image capture devices onboard the vehicle. By way of example, the vehicle is described herein as an autonomous vehicle which may, in turn, be a fully autonomous vehicle or a partly autonomous vehicle. Alternatively, the vehicle need not be autonomous, but may be manually operated. Regardless of the type of vehicle, the images obtained by the one or more image capture devices onboard the vehicle have respective fields of view that depict the area in proximity to the current location of the vehicle, such as images forward and to both sides of the road captured by a forwardly facing camera and images rearward and to both sides of the road captured by a rearwardly facing camera of the vehicle.

Among the features depicted by the images are road signs, such as road signs that are disposed at predefined locations along a road segment. The road signs may include, for example, mileage markers that are disposed at predefined locations, such as every mile, at every 0.1 mile, at every 0.2 mile or the like, along a road segment. Although the images may include any of a variety of different types of road signs and the estimation of the location of the vehicle may be based upon any of a variety of different types of road signs, mileage markers are a useful example of the road signs in that the mileage markers are located frequently such that two or more mileage markers may be represented by the image(s) captured by the image capture device(s) at any one point in time. Additionally, the mileage markers are spaced apart by a predefined distance and are positioned at predefined locations. Regardless of the type of road sign, the road signs that are identified within the images captured by the image capture devices onboard the vehicle generally have a predefined size and shape and other indicia so as to permit the type of road sign and, in some embodiments, the specific individual road sign to be identified from the images captured by the image capture devices.

Although the road signs may be identified in various manners, the apparatus 30 of an example embodiment, such as the processing circuitry 32, is configured to implement one or more neural networks, such as a convolutional neural network (CNN), a recurrent neural network (RNN) or the like, that has been trained, such as by an edge computing device, to identify road signs. In this regard, the neural network implemented by the apparatus, such as the processing circuitry, may be trained based upon the size, shape and other indicia associated with road signs in order to identify a particular type of road sign and, in some embodiments, a specific individual road sign, from an image. Although a single computing device, such as a computing device onboard the vehicle, such as the ECM, or an edge computing device may be configured to both train the model and then utilize the model to estimate the location of a vehicle, the edge computing device of some embodiments collaborates with a computing device onboard the vehicle, such as the ECM, in that the edge computing device trains a model including the one or more neural networks to identify road signs and then causes the model to be provided to a computing device onboard the vehicle, such as the ECM, to permit identification of each of the two or more road signs as described below. The road signs employed in a respective country or region may be consistent such that one type of road sign has a consistent size, shape and other indicia throughout the country or region, thereby permitting the neural network to be trained to recognize the road signs depicted in images captured within the country or region.

However, the size, shape and other indicia of road signs may vary between countries or regions such that one type of sign may have a consistent size and shape in one country and a different, but consistent size and shape in a different country. In this instance, the processing circuitry 32 may include one or more neural networks that have been trained, such as by an edge computing device, based upon information regarding the road signs utilized in different respective countries or regions, such as the size, shape and other indicia of road signs utilized in various countries. As shown in FIG. 4, the apparatus 30, such as the processing circuitry, of an example embodiment may include a plurality of neural networks 50, each of which is trained to recognize the road signs of a different respective country or region. To facilitate the training of the neural networks, the apparatus, such as the processing circuitry, may be in communication with a plurality of road sign databases 52, each of which provides information regarding the road signs of a respective country or region, such as the size, shape and other identifying indicia of the road signs of a respective country or region. As such, the apparatus, such as the processing circuitry and, more particularly, the neural networks, of this example embodiment are trained, such as by an edge computing device, with the information provided by the road sign databases to identify a road sign from an image based upon the size, shape and other identifying indicia of the road sign even though the same type of road sign may differ in appearance from one country or region to another.

As shown in block 42 of FIG. 3, the apparatus 30 of an example embodiment also includes means, such as the processing circuitry 32 or the like, configured to determine respective distances between the vehicle and each of two or more road signs depicted by the one or more images. The apparatus, such as the processing circuitry, is configured to determine the distance between the vehicle and a respective road sign depicted by an image in various manners including, for example, by utilization of a pixel-to-distance technique. Any of a variety of pixel-to-distance techniques can be utilized including those described by Paul Theodosis, et al, "EE368 Final Project: Road Sign Detection and Distance Estimation in Autonomous Car Application". Additionally, geometric camera calibration, also known as camera resectioning, as described by www.mathworks.com can be utilized to determine the distance. The distance may be determined in any of various formats including, for example, a Euclidean format.

By way of example and as shown in FIG. 5A, the one or more images captured by an image capture device onboard a vehicle includes two road signs spaced from one another along one side of the road segment along which the vehicle is traveling. In this example embodiment, the apparatus 30, such as the processing circuitry 32, is configured to separately determine the distance from the vehicle to each of the two road signs. For example, the apparatus, such as the processing circuitry, determines the distance to sign MM_1, to be d2 and the distance to road sign MM_2 to be d1. In this example embodiment, the road signs are mileage markers from mile 25 along East 94 with the road sign designated MM_1 being the mileage marker at mile 25.3 and the road sign designated MM_2 being the mileage marker for mile 25.2. As depicted in FIG. 5A, the apparatus, such as the processing circuitry, may also be configured to receive additional information associated with an image, such as the time—at which the image was captured, the speed of the vehicle at the time at which the image was captured and the like. In this regard, the image from which road signs depicted in FIG. 5A were identified was captured at a time corresponding to timestamp1 and while the vehicle had a speed designated speed1.

By way of another example, FIG. 6 depicts an embodiment in which the apparatus 30, such as the processing circuitry 32, has identified four road signs with two road signs on each of the opposed sides of the road segment. The apparatus, such as the processing circuitry, of this example embodiment is configured to determine the distance to each of the road signs that have been identified from the image with the road sign designated RS_1, RS_2, RS_3 and RS_4 being determined to be distances of d1, d2, d3 and d4 from the vehicle, respectively.

The apparatus 30 also includes means, such as the processing circuitry 32 or the like, to estimate the location of the vehicle based upon the respective distances between the vehicle and the road signs depicted by the one or more images. See block 44. In an example embodiment, the apparatus estimates the location of the vehicle by also including means, such as the processing circuitry, the memory 34 or the like, configured to identify a distance between the two or more road signs. The distance between the two or more signs may be identified in various manners. In an example embodiment in which the road signs are mileage markers, the distance between the road signs may be defined by the road signs themselves with the distance between the road signs being defined as the difference between the locations marked by the mileage markers. With respect to the example of FIG. 5A, the distance between the two mileage markers is 0.1 miles.

In other example embodiments, the memory 34 is configured to store information associated with the road signs indicative of the location of each road sign and from which the distance between the road signs may be determined. In this example embodiment, the apparatus 30, such as the processing circuitry 32, is configured to identify a road sign that is depicted by an image, such as based upon the size, shape and other identifying indicia of the road sign. In this example embodiment, the apparatus, such as the processing circuitry, may be configured to compare the size, shape and other identifying indicia of a road sign depicted by an image to the information stored by the memory or by a database with which the apparatus is in communication that defines the size, shape and identifying indicia associated with the plurality of road signs. As such, the road sign that is depicted by the image is identifiable by the apparatus, such as the processing circuitry, from the information stored by the memory or the database. Once the road sign has been identified, the information stored by the memory or the database may also define the location of the road sign. Based upon the locations of the road signs depicted by the image on the same side of the road segment, the apparatus, such as the processing circuitry, of this example embodiment is configured to determine the distance between the road signs.

In this example embodiment, the apparatus 30 includes means, such as the processing circuitry 32 or the like, configured to estimate the location of the vehicle based upon the respective distances between the vehicle and each of the two or more road signs depicted by the one or more images and also based upon the distance between the two or more road signs on the same side of the road segment. In relation to the example depicted in FIG. 5A in which the first and second road signs are spaced apart from one another by dsep, e.g., 0.1 mile, the apparatus, such as the processing circuitry, is configured to determine the location of the vehicle utilizing the law of cosines as follows:

$$d1 = (dsep^2 + d2^2 - (2dsep * d2 * \cos \theta))^2 \text{ wherein } \theta \text{ is depicted in FIG. 5A}$$

which can be solved for the driving distance and, therefore, the location of the vehicle from the road sign MM_1 as follows:

$$d2 \cos \theta = (dsep^2 + d2^2 - d1^2)/2dsep$$

In an example embodiment, the apparatus 30, such as the processing circuitry 32, is configured to receive one or more images captured by the one or more image capture devices onboard the vehicle at each of a plurality of different instances in time as the vehicle travels along a road segment. In this regard, FIG. 5B depicts the same vehicle as that depicted in FIG. 5A at a subsequent time, that is, at a time corresponding to timestamp2, once the vehicle is driven further along the roadway from the position depicted in FIG. 5A. Based upon the images captured by the one or more image capture devices onboard the vehicle at the second instance in time, two road signs are identified along one side of the road segment, namely, the road sign designated MM_2 representing mileage marker 25.2 along East 94 and the road sign designated MM_3 representing mileage marker 25.1 along East 94. As indicated by FIG. 5B, these road signs were identified from image(s)s captured at a time corresponding with timestamp2 and while the vehicle is traveling at speed2. In this example embodiment, the apparatus, such as the processing circuitry, is configured to again determine the distances to the road signs, such as distance d3 from the vehicle to the road sign designated MM_3 and the distance d4 from the vehicle to the road sign designated MM_2. The location of the vehicle at this second instance in time depicted in FIG. 5B may then be determined by the apparatus, such as the processing circuitry, in the same way as described above utilizing the law of cosines by solving for the driving distance and, therefore, the location of the vehicle from the road sign MM_2 as follows:

$$d4 \cos 0 = (dsep^2 + d4^2 - d3^2)/2dsep$$

Alternatively, the location of the vehicle at the second instance in time may be determined by the apparatus 30, such as the processing circuitry 32, based upon the location of the vehicle at the first instance in time and the times at which the images were captured at the first and second instances in time and the speed of the vehicle at the times at which the images were captured at the first and second instances in time. In this example embodiment, the apparatus, such as the processing circuitry, may be configured to determine the difference between the location of the vehicle at the first and second instances in time as follows:

$$(timestamp2) - (time\ stamp1)) * ((speed2 + speed1)/2)$$

By combining, such as adding, this difference in location to the location of the vehicle at the first instance in time, the location of the vehicle at the second instance in time may be determined.

The apparatus 30, such as the processing circuitry 32, may be configured to estimate the location of the vehicle in other manners. For example, in an embodiment in which one or more road signs on opposite sides of the road segment are identified as shown in FIG. 6 from the one or more images captured by the one or more image capture devices onboard the vehicle, the apparatus may include means, such as the processing circuitry, the memory 34 or the like, configured to access information defining respective locations of a plurality of road signs including the two or more road signs that have been identified from the one or more images on opposite sides of the road. With reference to the example depicted in FIG. 6, the apparatus, such as the processing circuitry, may identify two road signs designated RS_1 and RS_2 on opposite sides of the road segment based upon an analysis of the image captured by a front camera onboard the vehicle and may identify two other road signs designated RS_3 and RS_4 on opposite sides of the road segment based upon an analysis of the image captured by a rear camera onboard the vehicle. The apparatus, such as the processing circuitry, of this example embodiment is configured to access information, such as stored by the memory or by a database with which the apparatus is in communication, in order to identify the location of each of the road signs identified from the images captured by image capture device(s) onboard the vehicle. As described above, the apparatus, such as the processing circuitry, is configured to identify the two or more road signs depicted by the images captured by the image capture device(s) onboard the vehicle, such as based upon a comparison of the size, shape and identifying indicia of the road signs in relation to the size, shape, identifying indicia and location of a plurality of road signs throughout the road network as defined by information provided by the memory or by a database with which the apparatus is in communication. Once the road signs have been uniquely identified, the apparatus, such as the processing circuitry, is configured to access the information defining respective locations of the road signs, such as (x1, y1) for road sign RS_1, (x2, y2) for road sign RS_2, (x3, y3) for road sign RS_3 and (x4, y4) for road sign RS_4.

The apparatus 30, such as the processing circuitry 32, is also configured to determine the distance from the vehicle to each of the road signs, such as in the manner described above. In the example of FIG. 6, the vehicle is determined to be at distances of d1, d2, d3 and d4 from the road signs designated RS_1, RS_2, RS_3 and RS_4, respectively. In this example embodiment, the apparatus also includes means, such as the processing circuitry or the like, configured to estimate the location of the vehicle based upon the respective distances between the vehicle and each of the two or more road signs depicted by the one or more images and also based upon the respective locations of the two or more road signs. In this example embodiment, the apparatus, such as the processing circuitry, is configured to estimate the location of the vehicle by employing a centroid technique to estimate the location of the vehicle based upon the respective distances between the vehicle and each of the two or more road signs depicted by the one or more images and also based upon the respective locations of the two or more road signs. With reference to the example embodiment depicted in FIG. 6, the apparatus, such as the processing circuitry, may employ a centroid technique to determine the location (x,y) of the vehicle as follows:

$$x = \frac{\frac{x1}{d1} + \frac{x2}{d2} + \frac{x3}{d3} + \frac{x4}{d4}}{\frac{1}{d1} + \frac{1}{d2} + \frac{1}{d3} + \frac{1}{d4}}, y = \frac{\frac{y1}{d1} + \frac{y2}{d2} + \frac{y3}{d3} + \frac{y4}{d4}}{\frac{1}{d1} + \frac{1}{d2} + \frac{1}{d3} + \frac{1}{d4}}. \qquad a$$

Once the location of the vehicle has been determined as described above, the apparatus 30, such as the processing circuitry 32, of an example embodiment is configured to determine the road signs that should have appeared in the images captured by the one or more image capture devices onboard the vehicle, thereby providing for validation of the map data. For example, the apparatus, such as the processing circuitry, may include or obtain information regarding the field of view of each image capture device onboard the vehicle and the information regarding the field of view may be coupled with the location of the vehicle to determine the geographical region that appears within the field of view of a respective image capture device onboard the vehicle. The apparatus, such as the processing circuitry, of this example embodiment is configured to then determine the one or more road signs that should have appeared within the field of view of the respective capture device(s). In this regard, the apparatus, such as the processing circuitry, is configured to access information, such as information stored by the memory 34 or a database with which the apparatus is in communication, that defines the location of a plurality of road signs located throughout the road network. Based upon the geographical region that appears within the field of view of the respective image capture device onboard the vehicle and the location of a plurality of road signs located throughout the road network, the apparatus, such as the processing circuitry, of this example embodiment is configured to determine the road sign(s) that should be visible within the image captured by the respect image capture device.

The apparatus 30, such as the processing circuitry 32, is then configured to compare the one or more road signs that were identified to be depicted within the image captured by the respective image capture device and the one or more road signs that should have appeared within the image captured by the respective image capture device. In an instance in which one or more road signs that should have been visible within the field of view of a respective image capture device were not actually identified from the image captured by the respective image capture device, the apparatus, such as the processing circuitry, is configured to detect that a road sign is missing. This information regarding a road sign that is missing, including information regarding the location of the road sign that is missing, may be provided or reported, such as to the Department of Transportation or other road authority responsible for maintenance of the road network and the road signs therealong.

In an example embodiment, the location the vehicle is estimated based solely upon images captured by the one or more image capture devices onboard the vehicle and processed in the manner described above. In other example embodiments, however, the location of the vehicle is initially estimated utilizing one or more other techniques with the location of the vehicle then refined based upon an analysis of road signs within the one or more images obtained by one or more image capture devices onboard the vehicle.

In this example embodiment depicted in FIG. 7, the apparatus 30 includes means, such as the processing circuitry 32 or the like, configured to estimate an initial location of the vehicle based upon satellite, cellular or other radio signals. See block 60. In this regard, the initial location of the vehicle may be estimated based upon satellite signals, such as satellite signals captured by a GNSS or other satellite signal receiver onboard the vehicle, such as GOS signals, GLONASS signals, Galileo signals, BeiDou signals, Compass signals or the like. Additionally, or alternatively, the initial location may be based upon radio signals, such as Wi-Fi signals, Bluetooth signals or the like. Based upon the initial location of the vehicle, such as is estimated based upon satellite, cellular or other radio signals, the apparatus, such as the processing circuitry, of this example embodiment is configured to determine a road segment upon which the vehicle is traveling. See block 62. In this regard, the determination of the road segment is also based upon map information including a representation of the road segment, such as may be provided by a map database. As such, the apparatus, such as the processing circuitry, of an example embodiment is configured to map match the initial location of the vehicle to a road segment as defined by the map information.

The apparatus 30 of this example embodiment also includes means, such as the processing circuitry 32 or the like, configured to determine a lane of the road segment in which the vehicle is traveling based upon at least one of RADAR or LIDAR data. See block 64. In this example embodiment, the RADAR or LIDAR data may be representative of road features positioned laterally relative to the vehicle, such as based upon a determination of the edges of the roadway, a determination of lane markers or the like. Once the road segment and the lane of the road segment in which the vehicle is traveling have been determined, the apparatus, such as the processing circuitry, of this example embodiment is also configured to refine the location, such as by refining the location upon the road segment and the location within the lane of the road segment based upon an analysis of one or more images obtained by one or more image capture devices onboard the vehicle and the two or more road signs depicted by the one or more images in the manner described above.

While the apparatus 30, such as the processing circuitry 32, may refine the location of the vehicle based upon identification of two or more road signs from images captured by one or more image capture devices onboard the vehicle in every instance, the apparatus, such as the processing circuitry, of an example embodiment may be configured to refine the location of the vehicle in only certain instances, such as based upon the accuracy of the initial location. In this regard, the apparatus, such as the processing circuitry, is configured to determine whether the estimation of the initial location, that is, the initial determination of the road segment and the lane of the road segment, provides sufficient accuracy, such as may be defined by the original equipment manufacturer. See block 66. By way of example but not of limitation, the apparatus, such as the processing circuitry, may be configured to determine that the estimation of the initial location provides sufficient accuracy in an instance in which a predetermined percent, e.g., 99.99% of location error is less than a predefined distance, e.g., 0.2 meters, from ground truth. In an instance in which the initial location that is determined for the vehicle, that is, the determination of the road segment and the lane of the road segment does, provides sufficient accuracy, the apparatus, such as the processing circuitry, this example embodiment does not refine the location as the processing resources that would be consumed to refine the location are not justified in light of the sufficiency of the location that has already been determined. However, in an instance in which the initial location that is estimated, such as the road segment and the lane of the road segment that are determined, is determined to not provide sufficient accuracy, the apparatus, such as the processing circuitry, is then configured to refine the location of the vehicle within the lane of the road segment based upon an analysis of one or more images obtained by one or more image capture devices onboard the vehicle, including an analysis of the two or more road signs depicted by the one or more images in the manner described above, such as in conjunction with FIG. 4. See block 68. As such, the vehicle may be located including being located within a lane of the red segment in a more accurate fashion as a result of having refined the location in this example embodiment.

Once the location of the vehicle has been determined, the location may be utilized for navigation and/or mapping purposes. With respect to a manually operated vehicle including a navigation system, the location of the vehicle may be provided to the navigation and/or mapping system in order to permit the location of the vehicle to be more accurately represented upon a map presented by the mapping system and/or to provide more accurate navigation information via the navigation system. Alternatively, in relation to either a manually operated vehicle or an autonomous vehicle, the location of the vehicle may be reported to a control center, such as offboard the vehicle, as shown, for example by block 70 of FIG. 7, Based upon the location of the vehicle, the control center may provide navigational directions to the vehicle, such as may be presented via navigation system to the driver of a manually operated vehicle or that may more directly control the navigation of an autonomous vehicle. By utilizing the more accurate location of the vehicle that is provided in accordance with an example embodiment, the vehicle may be navigated with more precision and reliability and correspondingly, other vehicles in the proximity of the vehicle may also be navigated in a more reliable manner armed with more accurate location information for the vehicle.

FIGS. 4 and 7 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus 30 employing an embodiment of the present invention and executed by the processing circuitry 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for estimating a location of a vehicle, the method comprising:
    based upon one or more images obtained by one or more image capture devices onboard the vehicle, determining respective distances between the vehicle and each of two or more road signs depicted by the one or more images, wherein determining respective distances between the vehicle and each of the two or more road signs comprises identifying each of the two or more road signs depicted by the one or more images based upon information regarding the two or more road signs provided by a road sign database;
    accessing information from the road sign database defining respective locations of a plurality of road signs including the two or more identified road signs such that the location of each of the two or more respective road signs on a road segment is known;
    identifying a distance between the two or more road signs based at least in part upon the respective locations of the two or more identified road signs; and
    estimating the location of the vehicle based upon the respective distances between the vehicle and each of the two or more road signs depicted by the one or more images and also based upon the distance between the two or more road signs.

2. A method according to claim 1 further comprising:
    estimating an initial location of the vehicle based upon satellite, cellular or other radio signals;
    determining a road segment upon which the vehicle is traveling based upon the initial location and map information including a representation of the road segment; and
    determining a lane of the road segment in which the vehicle is traveling based upon at least one of radio detection and ranging (RADAR) or light detection and ranging (LIDAR) data,
    wherein estimating the location of the vehicle comprises refining the location of the vehicle within the lane of the road segment based upon the respective distances between the vehicle and each of the two or more road signs depicted by the one or more images and also based upon the distance between the two or more road signs.

3. A method according to claim 1 wherein the information regarding the two or more road signs comprises information regarding an appearance of the road signs in different countries or regions.

4. A method according to claim 1 further comprising:
    training a model with an edge computing apparatus in order to identify each of the two or more road signs; and
    causing the model to be provided to a computing device onboard the vehicle to permit identification of each of the two or more road signs.

5. An apparatus configured to estimate a location of a vehicle, the apparatus comprising processing circuitry and at least one non-transitory memory including computer program code instructions, the computer program code instructions configured to, when executed by the processing circuitry, cause the apparatus to:
    based upon one or more images obtained by one or more image capture devices onboard the vehicle, determine respective distances between the vehicle and each of two or more road signs depicted by the one or more images, wherein the respective distances between the vehicle and each of the two or more road signs are determined by identifying each of the two or more road signs depicted by the one or more images based upon information regarding the two or more road signs provided by a road sign database;
    access information from the road sign database defining respective locations of a plurality of road signs including the two or more identified road signs such that the location of each of the two or more respective road signs on a road segment is known;

identify a distance between the two or more road signs based at least in part upon the respective locations of the two or more identified road signs; and estimate the location of the vehicle based upon the respective distances between the vehicle and each of the two or more road signs depicted by the one or more images and also based upon the distance between the two or more road signs.

6. An apparatus according to claim 5 wherein the computer program code instructions are further configured to, when executed by the processing circuitry, cause the apparatus to:

estimate an initial location of the vehicle based upon satellite, cellular or other radio signals;

determine a road segment upon which the vehicle is traveling based upon the initial location and map information including a representation of the road segment; and determine a lane of the road segment in which the vehicle is traveling based upon at least one of radio detection and ranging (RADAR) or light detection and ranging (LIDAR) data, wherein the computer program code instructions are also configured to, when executed by the processing circuitry, cause the apparatus to estimate the location of the vehicle by refining the location of the vehicle within the lane of the road segment based upon the respective distances between the vehicle and each of the two or more road signs depicted by the one or more images and also based upon the distance between the two or more road signs.

7. An apparatus according to claim 5 wherein the apparatus is embodied by an edge computing apparatus.

8. A method for estimating a location of a vehicle, the method comprising:

based upon one or more images obtained by one or more image capture devices onboard the vehicle, determining respective distances between the vehicle and each of two or more road signs depicted by the one or more images, wherein the two or more road signs are positioned on opposite sides of a road on which the vehicle is traveling, and wherein determining respective distances between the vehicle and each of the two or more road signs comprises identifying each of the two or more road signs depicted by the one or more images based upon information regarding the two or more road signs provided by a road sign database;

accessing information from the road sign database defining respective locations of a plurality of road signs including the two or more identified road signs such that the location of each of the two or more respective road signs on a road segment is known; and estimating the location of the vehicle based upon the respective distances between the vehicle and each of the two or more road signs depicted by the one or more images and also based upon the respective locations of the two or more identified road signs.

9. A method according to claim 8 further comprising detecting a road sign that is missing based upon the one or more images and the information defining respective locations of the plurality of road signs that would place the road sign that is missing within the one or more images.

10. A method according to claim 8 further comprising:

estimating an initial location of the vehicle based upon satellite, cellular or other radio signals;

determining a road segment upon which the vehicle is traveling based upon the initial location and map information including a representation of the road segment; and determining a lane of the road segment in which the vehicle is traveling based upon at least one of radio detection and ranging (RADAR) or light detection and ranging (LIDAR) data, wherein estimating the location of the vehicle comprises refining the location of the vehicle within the lane of the road segment based upon the respective distances between the vehicle and each of the two or more road signs depicted by the one or more images and also based upon the respective locations of the two or more road signs.

11. A method according to claim 8 wherein estimating the location of the vehicle comprises employing a centroid technique to estimate the location of the vehicle based upon the respective distances between the vehicle and each of the two or more road signs depicted by the one or more images and also based upon the respective locations of the two or more road signs.

12. A method according to claim 8 further comprising:

training a model with an edge computing apparatus in order to identify each of the two or more road signs; and causing the model to be provided to a computing device onboard the vehicle to permit identification of each of the two or more road signs.

13. An apparatus configured to estimate a location of a vehicle, the apparatus comprising processing circuitry and at least one non-transitory memory including computer program code instructions, the computer program code instructions configured to, when executed by the processing circuitry, cause the apparatus to:

based upon one or more images obtained by one or more image capture devices onboard the vehicle, determine respective distances between the vehicle and each of two or more road signs depicted by the one or more images, wherein the two or more road signs are positioned on opposite sides of a road on which the vehicle is traveling, and wherein the respective distances between the vehicle and each of the two or more road signs are determined by identifying each of the two or more road signs depicted by the one or more images based upon information regarding the two or more road signs provided by a road sign database;

access information from the road sign database defining respective locations of a plurality of road signs including the two or more identified road signs such that the location of each of the two or more respective road signs on a road segment is known; and estimate the location of the vehicle based upon the respective distances between the vehicle and each of the two or more road signs depicted by the one or more images based upon the respective locations of the two or more identified road signs.

14. An apparatus according to claim 13 wherein the computer program code instructions are further configured to, when executed by the processing circuitry, cause the apparatus to detect a road sign that is missing based upon the one or more images and the information defining respective locations of the plurality of road signs that would place the road sign that is missing within the one or more images.

15. An apparatus according to claim 13 wherein the computer program code instructions are further configured to, when executed by the processing circuitry, cause the apparatus to:

estimate an initial location of the vehicle based upon satellite, cellular or other radio signals;

determine a road segment upon which the vehicle is traveling based upon the initial location and map information including a representation of the road segment; and determine a lane of the road segment in which the vehicle is traveling based upon at least one of radio detection and ranging (RADAR) or light detection and ranging (LIDAR) data, and wherein the computer program code instructions are also configured to, when executed by the processing circuitry, estimate the location of the vehicle by refining the location of the vehicle within the lane of the road segment based upon the respective distances between the vehicle and each of the two or more road signs depicted by the one or more images and also based upon the respective locations of the two or more road signs.

16. An apparatus according to claim 13 wherein the computer program code instructions are also configured to, when executed by the processing circuitry, estimate the location of the vehicle by employing a centroid technique to estimate the location of the vehicle based upon the respective distances between the vehicle and each of the two or more road signs depicted by the one or more images and also based upon the respective locations of the two or more road signs.

17. An apparatus according to claim 13 wherein the apparatus is embodied by an edge computing apparatus.

18. A method according to claim 1 further comprising receiving at least one navigational direction based upon the estimated location of the vehicle.

* * * * *